Feb. 24, 1942.  E. RUSKA  2,274,215
ELECTRONIC MICROSCOPE
Filed Aug. 14, 1940
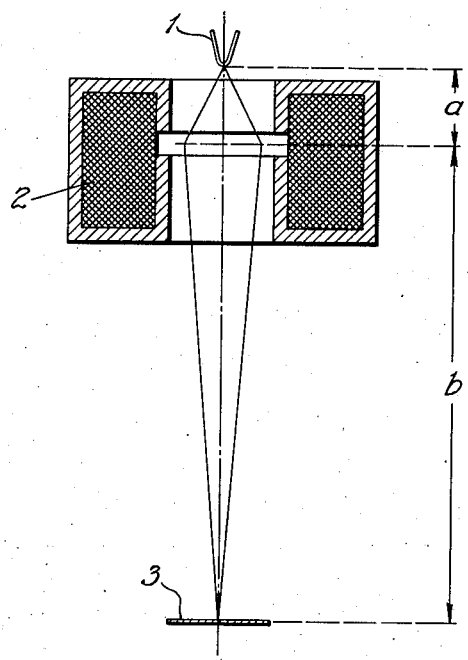
INVENTOR.
ERNST RUSKA
BY
ATTORNEYS.

Patented Feb. 24, 1942

2,274,215

UNITED STATES PATENT OFFICE 2,274,215

ELECTRONIC MICROSCOPE

Ernst Ruska, Berlin-Spandau, Germany, assignor to "Fides Gesellschaft für die Verwaltung und Verwertung von gewerblichen Schutzrechten mit beschränkter Haftung," Berlin, Germany, a corporation of Germany Application August 14, 1940, Serial No. 352,506
In Germany July 22, 1939

2 Claims. (Cl. 250—49.5)

This invention relates to improvements in electronic microscopes.

When projecting objects with the aid of an electronic microscope, foils are employed as supports for the object to be projected, consisting either of organic substances or metal. The thickness of such foils must be relatively small, since otherwise an appreciable absorption of electrons would occur which would impair the quality of the electron optical image. Also, when using the thinnest possible foils, a detrimental absorption of electrons occurs if the current density in the plane in which the object lies is too high. As a result, the object may be burnt. Particularly, great current densities always occur in cases where the cathode is projected by the condenser lens on the plane in which the object lies. This is particularly due to the fact that the arrangement has hitherto been so designed that a reduced image of the cathode is obtained in the plane of the object. To remove the above-mentioned drawbacks, the electric and magnetic operating data of the electronic microscope have hitherto been so chosen that a focussing of the electron rays takes place in front or behind the object. To prevent in this case the foils from being damaged also when putting the electron microscope into operation, it has already been proposed to design and interconnect the switches for the individual power sources of the electronic microscope in such a manner that the condenser lens can only be energized after the electron ray is impressed with the full operating voltage.

According to the invention, it is possible to prevent the production of too high a current density in the plane in which the object lies without it being necessary to employ particular interlocking switch arrangements or other additional safety means. This is accomplished according to the invention by placing the condenser lens so close to the cathode that, when adjusting the condenser lens or cathode so as to obtain an image of the cathode in the plane of the object, this cathode image is of magnified proportions. This magnification of the cathode image is so chosen as to prevent an unduly high current density in the object when adjusting the image of the cathode in the plane of the object. As a result, an undue load cannot occur during the operation of the electronic microscope, so that such safety measures as the interlocking of the individual switches of the electronic microscope may be dispensed with.

If the electron emitting source is projected on the object without magnification, not only the greatest current density is obtained but also the greatest aperture at the place of the object. However, such a large aperture tends to increase the aperture faults. In this respect, the present invention also presents an improvement because by projecting a magnified image of the cathode on the object, the magnification can be so chosen that the aperture is sufficiently great, yet not so excessive as to cause unduly great aperture faults. Arrangements according to the invention have a small focal length of the condenser system. Consequently, the change in the current density and therefore of the aperture angle is also maintained within small limits for a given change in the current flowing in the magnetic coil of the condenser lens. The current density may be thus varied within wide limits. As a result, the invention affords the possibility of regulating the condenser current within a wide range of regulation without entailing the risk of damage to the object or disturbance of the electron-optical operation.

In the single figure of the drawing is shown an embodiment of the invention in diagrammatic form. I denotes the cathode of the ray producing system. The electron rays emitting from the cathode I are caused to converge on the object foil 3 by means of the condenser coil 2. The electron rays pass through the object which is magnified by means of one or more electron optical lenses (not shown).

As will be seen from the drawing, an image of the cathode I is projected by the lens 2 on the plane in which the object 3 lies. In this case the distance $a$ of the condenser coil from the cathode is so chosen that a magnified image of the cathode is obtained on the object. As practical tests have shown, an image of the cathode on the object magnified in the ratio 3:1 is especially advantageous in order to obtain the various results above stated. In order to attain a proper centering of the ray with respect to the magnetic or mechanical axis of the condenser coil, it is further preferable to make the distance of the cathode from the object as small as possible for a given distance of the condenser coil from the cathode.

What is claimed is:

1. A radiating system for electron microscopical apparatus and the like having an electron-emitting cathode, means for holding an object in the path of the electrons, and an electron-optical condensing lens for concentrating the electrons onto the object, said condensing lens being arranged close to said cathode so as to obtain a magnified image of said cathode in the plane of said object.

2. A radiating system for electron microscopical apparatus and the like having an electron-emitting cathode, means for holding an object in the path of the electrons, and an electron-optical condensing lens for concentrating the electrons onto the object, said condensing lens being arranged close to said cathode so as to obtain a cathode image of about three times linear magnification in the plane of the object.

ERNST RUSKA.